United States Patent
Ali et al.

(10) Patent No.: US 11,627,641 B2
(45) Date of Patent: Apr. 11, 2023

(54) INTERWORKING FUNCTION TO CONNECT A DEVICE WITHIN A 2G OR 3G NETWORK TO A 5G NETWORK

(71) Applicant: Cisco Technology, Inc., San Jose, CA (US)

(72) Inventors: Irfan Ali, Palo Alto, CA (US); Ian McDowell Campbell, Littleton, CO (US); Ravi Shankar Mantha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 23 days.

(21) Appl. No.: 17/336,857

(22) Filed: Jun. 2, 2021

(65) Prior Publication Data
US 2022/0394819 A1 Dec. 8, 2022

(51) Int. Cl.
*H04W 88/16* (2009.01)
*H04W 76/12* (2018.01)
*H04W 76/16* (2018.01)
*H04W 28/02* (2009.01)

(52) U.S. Cl.
CPC ....... *H04W 88/16* (2013.01); *H04W 28/0268* (2013.01); *H04W 76/12* (2018.02); *H04W 76/16* (2018.02)

(58) Field of Classification Search
None
See application file for complete search history.

(56) References Cited

U.S. PATENT DOCUMENTS

| 10,856,362 | B2 | 12/2020 | Agarwal et al. | |
| 2006/0050667 | A1* | 3/2006 | Verma | H04W 92/02 370/338 |
| 2016/0381662 | A1* | 12/2016 | Wang | H04W 12/00 370/329 |
| 2020/0107230 | A1 | 4/2020 | Zhao et al. | |
| 2021/0014754 | A1 | 1/2021 | Ke | |

FOREIGN PATENT DOCUMENTS

| EP | 3745811 | 12/2020 |
| EP | 3793231 | 3/2021 |

* cited by examiner

*Primary Examiner* — Hong Shao
(74) *Attorney, Agent, or Firm* — Polsinelli

(57) ABSTRACT

The present technology is directed to establishing a connection between a client device within a 2G or 3G network and 5G core through an interworking function. The present technology can perform establishing a Gn-4G interworking function (IWF) between a client access network and a packet anchor network and performing one or more network functions through the Gn-4G IWF in providing a client of the client access network access to network services through the packet anchor network. The one or more network functions appear as one or more Gateway GPRS Support Node (GGSN) functions from the client access network (e.g., 2G or 3G network). The one or more network functions concurrently appear as one or more S4 Serving GPRS Support Node (SGSN) functions from the packet anchor network (e.g., 4G or 5G network).

19 Claims, 17 Drawing Sheets

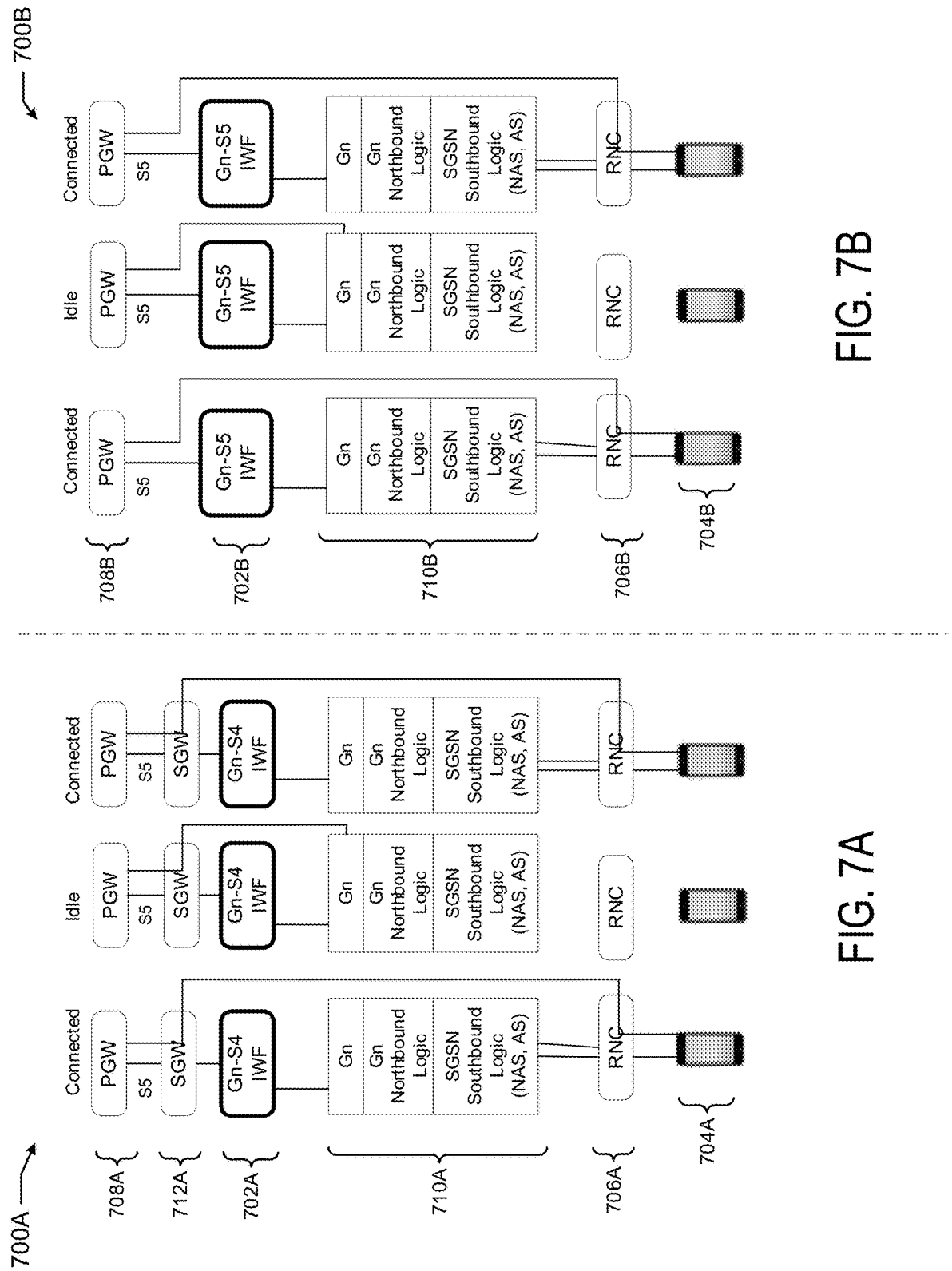

1100A

| GTPv1-C | | | GTPv2-C | |
|---|---|---|---|---|
| Message Type value (Decimal) | Message | Condition | Message Type value (Decimal) | Message |
| 1 | Echo Request | | 1 | Echo Request |
| 2 | Echo Response | | 2 | Echo Response |
| 3 | Version Not Supported | | 3 | Version Not Supported Indication |
| 16 | Create PDP Context Request | Primary PDP context | 32 | Create Session Request |
| | | Seconday PDP context | 34 | Modify Bearer Request |
| 17 | Create PDP Context Response | Primary PDP context | 33 | Create Session Response |
| | | Secondary PDP context | 35 | Modify Bearer Response |
| 18 | Update PDP Context Request | Moving tunnel | 34 | Modify Bearer Request |
| | | SGSN init Mods | 64 | Modify Bearer Command |
| | | MS initiated Mods | 68 | Bearer Resource Command |
| 19 | Update PDP Context Response | | 35 | Update Bearer Response |
| 20 | Delete PDP Context Request | Primary PDP context | 36 | Delete Session Request |
| | | Seconday PDP context | 66 | Delete Bearer Command |
| 21 | Delete PDP Context Response | Primary PDP context | 37 | Delete Session Response |
| | | Primary PDP context | 99 | Delete Bearer Request |
| 22 | Initiate PDP Context Activation Request | | 95 | Create Bearer Request |
| 23 | Initiate PDP Context Activation Response | | 96 | Create Bearer Response |
| 31 | Supported Extension Headers Notification | Not mapped | | |
| 128 | MS Info Change Notification Request | | 38 | Change Notification Request |
| 129 | MS Info Change Notification Response | | 39 | Change Notification Response |

FIG. 11A

| GTPv2-C | | GTPv1-C | | |
|---|---|---|---|---|
| Message Type value (Decimal) | Message | Message Type value (Decimal) | Message | Comments |
| 1 | Echo Request | 1 | Echo Request | |
| 2 | Echo Response | 2 | Echo Response | |
| 3 | Version Not Supported Indication | 3 | Version Not Supported | |
| 32 | Create Session Request | NA | Always from SGSN (see v1 to v2 mapping) | |
| 33 | Create Session Response | NA | Always from SGSN (see v1 to v2 mapping) | |
| 36 | Delete Session Request | NA | Always from SGSN (see v1 to v2 mapping) | |
| 37 | Delete Session Response | NA | Always from SGSN (see v1 to v2 mapping) | |
| 34 | Modify Bearer Request | NA | Always from SGSN (see v1 to v2 mapping) | |
| 35 | Modify Bearer Response | NA | Always from SGSN (see v1 to v2 mapping) | |
| 38 | Change Notification Request | NA | Always from SGSN (see v1 to v2 mapping) | |
| 39 | Change Notification Response | NA | Always from SGSN (see v1 to v2 mapping) | |
| 64 | Modify Bearer Command | NA | Always from IWF (mapped from Update PDP Context Request) | |
| 65 | Modify Bearer Failure Indication | 19 | Update PDP Context Response | |
| 66 | Delete Bearer Command | NA | Always from IWF (mapped from Update PDP Context Request) | |
| 67 | Delete Bearer Failure Indication | 19 | Update PDP Context Response | |
| 68 | Bearer Resource Command | NA | Always from IWF (mapped from Update PDP Context Request) | |
| 69 | Bearer Resource Failure Indication | 19 | Update PDP Context Response | |
| 95 | Create Bearer Request | 16 | Create PDP Context Request | |
| 96 | Create Bearer Response | 17 | Create PDP Context Response | |
| 97 | Update Bearer Request | 18 | Update PDP Context Request | Multiple issued, one for each PDP context |
| 98 | Update Bearer Response | 19 | Update PDP Context Response | Multiple issued, one for each PDP context |
| 99 | Delete Bearer Request | 20 | Delete PDP Context Request | Multiple issued, one for each PDP context |
| 100 | Delete Bearer Response | 21 | Delete PDP Context Response | Multiple issued, one for each PDP context |

FIG. 11B

INTERWORKING FUNCTION TO CONNECT A DEVICE WITHIN A 2G OR 3G NETWORK TO A 5G NETWORK

DESCRIPTION OF THE RELATED TECHNOLOGY

The subject matter of this disclosure relates in general to the field of computer networking, and more particularly, to systems and methods for establishing a connection between a wireless communication device within a 2G or 3G access network and 5G Core through an interworking function.

BACKGROUND

Current Mobile and wireless communication systems have widely adopted a next generation wireless communication system, 5G, or new radio (NR) that provides much higher data rates and lower latency. A 5G radio access network (RAN) and 5G core network (5GC) are designed to interoperate together with a 4G (LTE) RAN and its core network, respectively. However, the 5G RAN and 5GC do not support 2G or 3G RAN and core network. As a result, a 5G subscriber can lack network connectivity in an area that only provides 2G or 3G coverage. One solution is to configure subscription of the 5G subscriber on a 4G core that also supports 2G or 3G access. However, this is extremely burdensome for network operators. In particular, not only does subscription information need to be coordinated across the 5G network and the 4G core, but also charging functions needs to be coordinated. Also, this does not enable mobility between 2G or 3G and 4G or 5G radio access networks.

BRIEF DESCRIPTION OF THE DRAWINGS

FIGS. 7A and 7B illustrate example diagrams of a network architecture with an interworking function where user equipment is in transition between an idle state and an active state according to one or more examples of the present disclosure.

FIGS. 11A and 11B illustrate an example procedure of mapping of GTPv1-C and GTPv2-C according to one or more examples of the present disclosure.

DETAILED DESCRIPTION

Figure 1A:
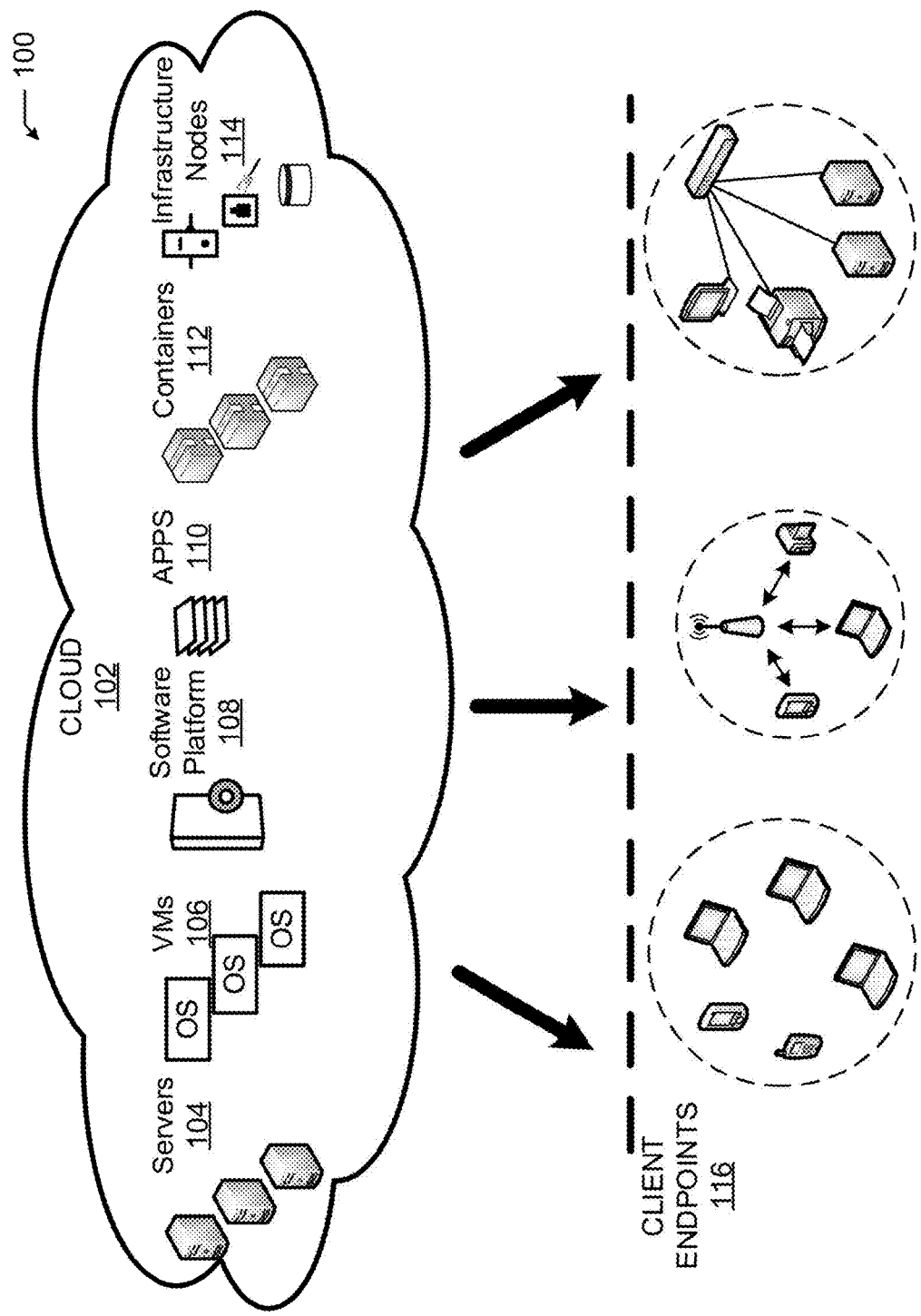
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following acronyms are used throughout the present disclosure, provided below for convenience.

AMF: Access and Mobility Management Function
BSS: Base Station Subsystem
CHF: Charging Function
EPC: 4G Evolved Packet Core
GERAN: GSM EDGE Radio Access Network
GGSN: Gateway GPRS Support Node
GTP: GPRS Tunneling Protocol
HSS: Home Subscriber Server
IWF: Inter-Working Function
MME: Mobility Management Entity
PCF: Policy Control Function
PCRF: Policy and Charging Rules Function
PGW: Packet Data Gateways
RNC: Radio Network Controller
SGSN: Serving GPRS Support Node
SGW: Serving Gateway
SMF: Session Management Function
SPR: Subscription Profile Repository
UDM: Unified Data Management
UDR: Unified Data Depository
UMTS: Universal Mobile Telecommunications Service
UPF: User Plane Function
UTRAN: UMTS Terrestrial Radio Access Network Current Mobile and wireless communication systems have widely adopted a next generation wireless communication system, 5G, or new radio (NR) that provides much higher data rates and lower latency. The 5G core network has been defined to enable access from 5G NR in standalone (5G SA) mode, which comprises 5G NR and 5GC where 5G RAN is deployed with the 5GC only. Also, the 5G system architecture defines the 5G core network in conjunction with 4G core network to enable access from 4G radio access network, which leverages the existing LTE radio access network and core network (EPC) to anchor 5G NR and enables access from NR in non-standalone (5G NSA) mode.

While the 5G System architecture enables access from both 5G radio access network and 4G radio access network, the 5G system architecture does not enable support from 2G or 3G radio access network. As such, a 5G subscriber cannot have a network connectivity to the 5G system in an area that only provides 2G or 3G coverage. While one possible solution is to serve the 5G subscriber with the existing 4G Evolved Packet Core (EPC) that can support 2G, 3G, and 4G, it becomes challenging for operators to configure suitable subscriptions on both the 5GC and a 4G core network, 4G Evolved Packet Core (EPC).

Therefore, there is a need for establishing an interworking function (IWF) between 2G/3G network and 4G/5G network that enables a connection between a device within a 2G/3G network and 5G network. For example, the IWF can be a Gn-S4 IWF or a Gn-S5 IWF that supports Gateway GPRS Support Node (GGSN) functions and S4 Serving GPRS Support Node (S4 SGSN) functions.

The present technology includes systems, methods, and computer-readable media for solving these problems and discrepancies. Specifically, systems, methods, and computer-readable media for establishing a connection between a device within 2G/4G network and 5GC through an interworking function are provided in the present disclosure.

OVERVIEW

Methods, systems, and non-transitory computer-readable media are provided for establishing a connection between a client device within 2G or 3G network and 5G core through an interworking function.

The present technology can include establishing a Gn-4G interworking function (IWF) between a client access network and a packet anchor network and performing one or more network functions through the Gn-4G IWF in providing a client of the client access network access to network services through the packet anchor network. The one or more network functions can appear as one or more Gateway GPRS Support Node (GGSN) functions from the client access network. Concurrently, the one or more network functions can appear as one or more S4 Serving GPRS Support Node (SGSN) functions from the packet anchor network.

The Gn-4G IWF can be a Gn-S4 IWF, which in conjunction with Gn-SGSN appears as a standalone S4 SGSN function. In another example, the Gn-4G IWF can be a Gn-S5 IWF, which in conjunction with a Gn-SGSN appears as an S4 SGSN function integrated into a Serving Gateway Control (SGW-C) function.

The client access network can be one of GSM Edge Radio Access Network (GERAN) or UMTS Terrestrial Radio Access Network (UTRAN). Further, the Gn-4G interworking function can be implemented at one or more servers in the packet anchor network.

Furthermore, in some examples, the packet anchor network can be part of a 5G Core network (5GC). In another example, the packet anchor network can be part of a 4G Core network. In case the packet anchor network is a 5G core network, the control-plane packet anchor function is an SMF+PGW-C and the user-plane packet anchor function is an UPF+PGW-U. In case the packet anchor network is a 4G core network, the control-plane packet anchor function is a PGW-C, which includes a GGSN-C functionality and the user-plane packet anchor function is a PGW-U, which includes a GGSN-U functionality. Furthermore, if a packet anchor network is a 4G core network the control-plane and user-plane packet anchor functions can be combined into one packet anchor node, the PGW, which includes PGW-C and PGW-U functionality and the GGSN-C and GGSN-U functionality.

The one or more network functions can include one or a combination of mapping between QoS parameters of the client access network and QoS parameters of the packet anchor network, converting data passing through the Gn-4G IWF between differing protocols of the client access network and the packet anchor network, and controlling the transmission of data to and from a serving gateway of the packet anchor network.

The present technology can further include detecting a switch in operation mode of the client between an active mode and an idle mode and controlling tunnel establishment for downlink buffering of data based on the operation mode of the client. Also, the present technology can perform establishing a tunnel between a serving gateway or userplane of the packet anchor node and a Gn interface of a Gn-SGSN for performing downlink buffering when the client is operating in an idle mode.

Furthermore, the present technology can include maintaining an IP address of the client as the client moves between the client access network (e.g., 2G or 3G radio access network) and the packet anchor network in accessing network services while the one or more network functions are performed at the Gn-4G IWF.

The present technology can also include mapping one or more Gn signaling messages to one or more S4 signaling messages, wherein the one or more network functions modify one or more of a bearer request, a bearer command, and a bearer resource command based on the mapping.

A system for establishing a connection between a client device within 2G or 3G network and 5G core through an interworking function can include one or more processors and at least one computer-readable storage medium storing instructions which, when executed by the one or more processors, cause the one or more processors to establish a Gn-4G interworking function (IWF) between a client access network and a packet anchor network and perform one or more network functions through the Gn-4G IWF in providing a client of the client access network access to network services through the packet anchor network. The one or more network functions can appear as one or more Gateway GPRS Support Node (GGSN) functions from the client access network. Concurrently, the one or more network functions along with Gn-SGSN can appear as one or more S4 Serving GPRS Support Node (SGSN) functions from the packet anchor network.

A non-transitory computer-readable storage medium having stored therein instructions which, when executed by one or more processors, can cause the one or more processors to establish a Gn-4G interworking function (IWF) between a client access network and a packet anchor network and perform one or more network functions through the Gn-4G IWF in providing a client of the client access network access to network services through the packet anchor network. The one or more network functions can appear as one or more Gateway GPRS Support Node (GGSN) functions from the client access network. Concurrently, the one or more network functions along with Gn-SGSN can appear as one or more S4 Serving GPRS Support Node (SGSN) functions from the packet anchor network.

DESCRIPTION

The disclosed technology addresses the need in the art for establishing a connection between a wireless communication device within a 2G or 3G access network and 5G Core through an interworking function.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
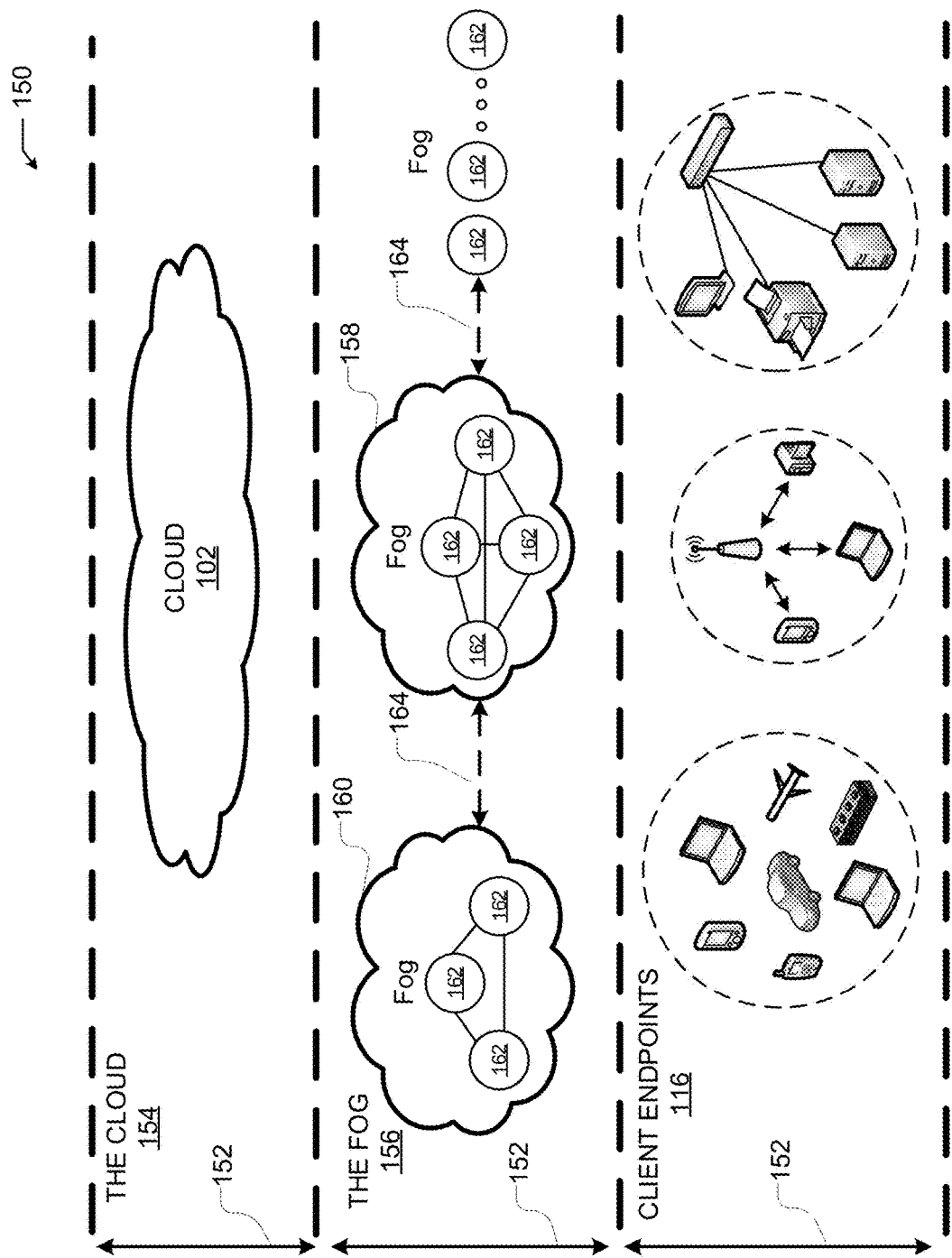
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
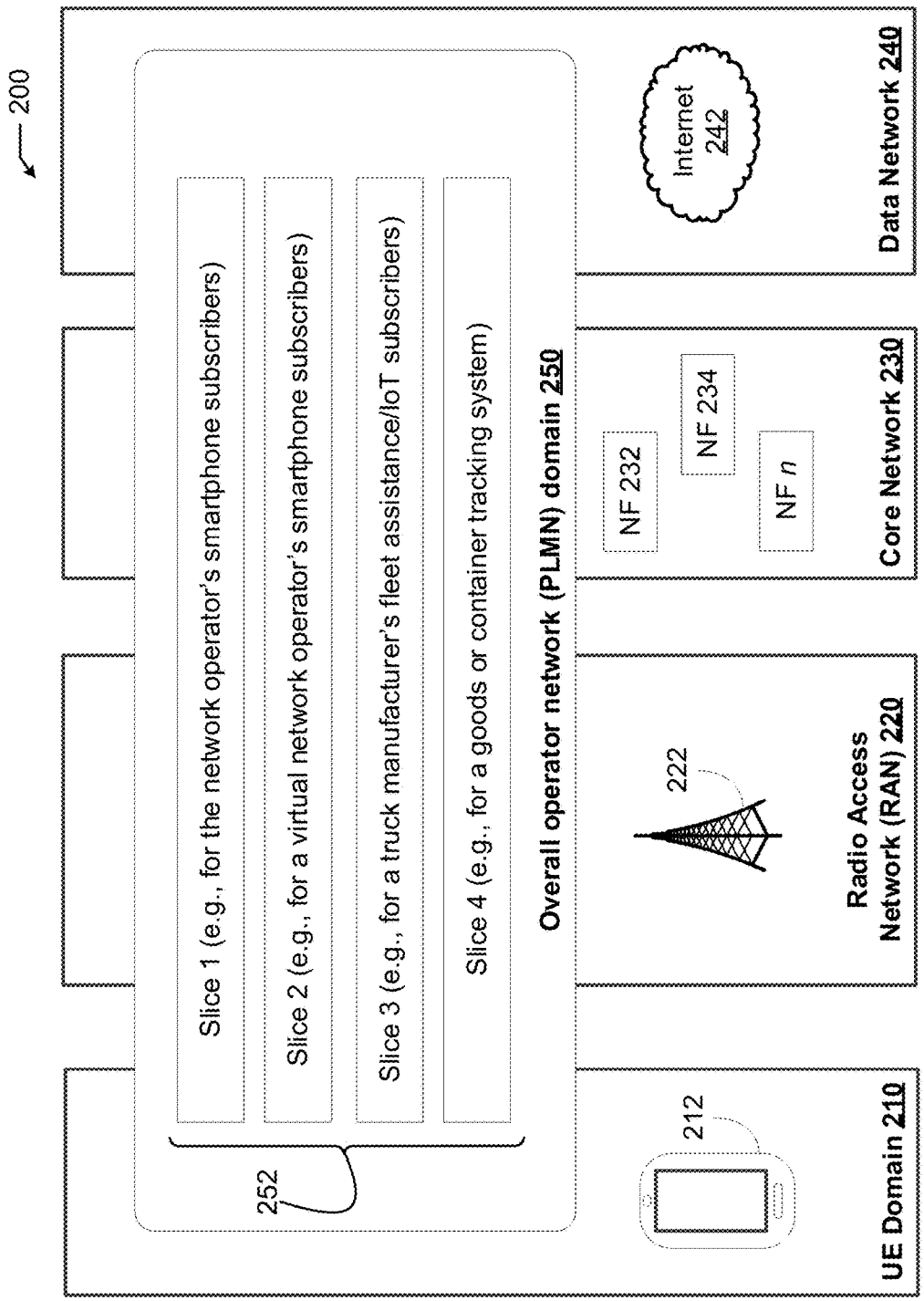
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Figure 3A:
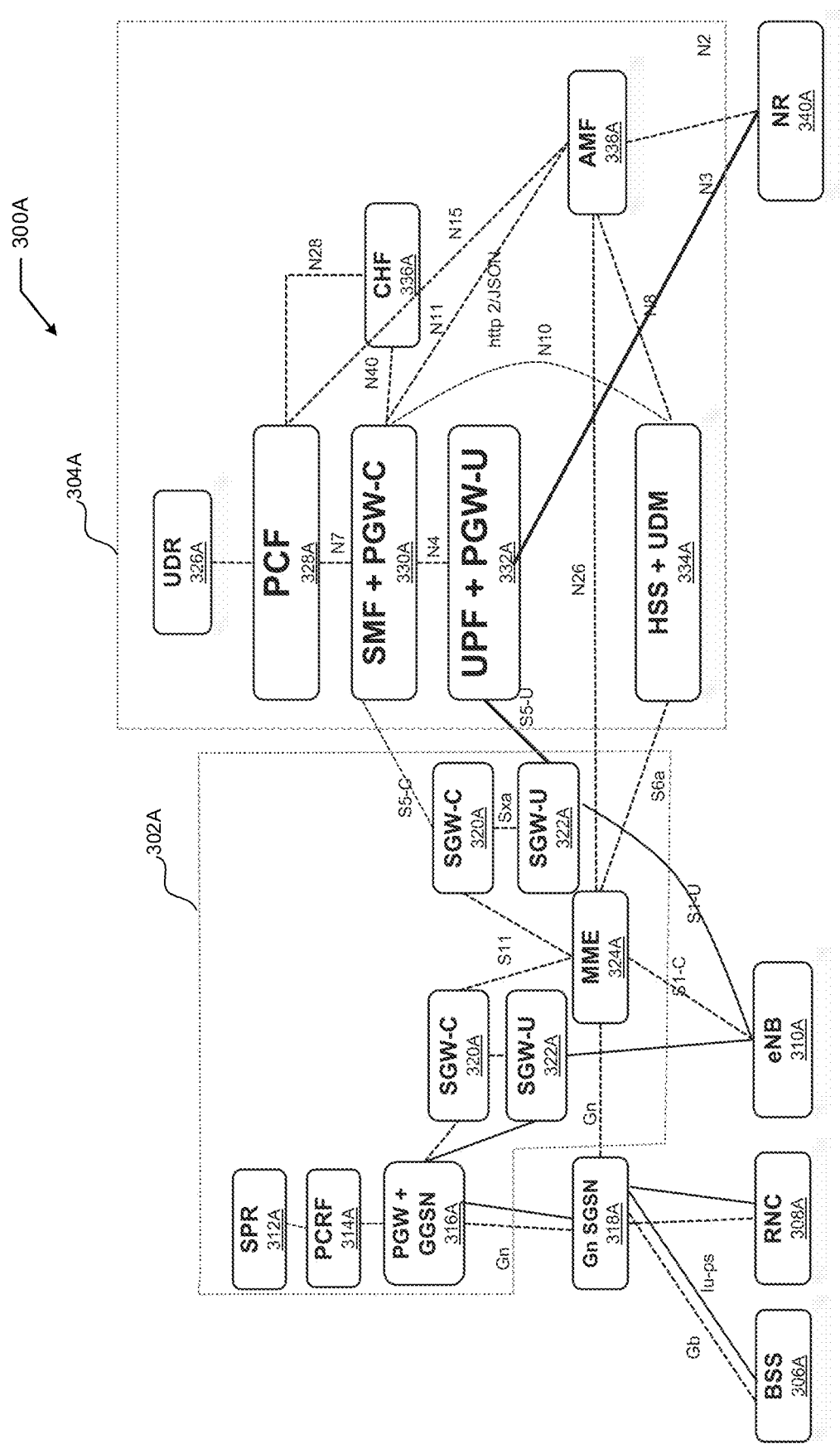
FIGS. 3A and 3B illustrate an example conventional network architecture of 4G and 5G.

FIG. 3A illustrates a conventional 5G network architecture 300A where 5G Core (5GC) 304A is designed to interoperate together with part of the 4G Evolved Packet Core (EPC) 302A and enable access via the 4G radio access network (RAN). In a 4G system, EPC 302A represents a 4G core network and eNB 310A represents a 4G RAN. In addition, EPC 302A also includes SGSN 318A, which anchors 3G RAN (e.g., Radio Network Controller (RNC) 308A) and 2G RAN (e.g., Base Station Subsystem (BSS) 306A). As illustrated in FIG. 3A, EPC 302A is composed of Packet Data Gateway (PGW)+GPRS Gateway Serving Node (GGSN) 316A, Serving Gateway (SGW) 320A and 322A, and Mobile Management Entity (MME) 324A, all of which are critical network functions for the 4G core network, EPC 302A. PGW anchors access via 4G RAN (e.g., eNB 310A) and GGSN anchors access via 3G RAN (e.g., RNC 308A) and 2G RAN (BSS 306A). PGW+GGSN 316A is a permanent IP point-of-attachment for access via eNB 310A, RNC 308A and BSS 306A. PGW+GGSN 306A serves as an anchor point for network mobility and manages quality of service (QoS). SGW (e.g., SGW-C 320A and SGW-U 322A) resides in the user plane where it forwards and routes packets to and from the eNB 310A and PGW 316A. SGW 320A and 322A also serves as the local mobility anchor for inter-eNB handover and mobility between 3GPP networks. MME 324A is a control plane function for the LTE access. MME 324A is responsible for authentication and critical management for mobile devices as well as for tracking and paging procedures for mobiles in idle mode for 4G RAN. Further, MME 324A authorizes bearer activation and deactivation including a SGW and PGW selection. Gn SGSN 318A is a control plane function for 2G or 3G access. Gn SGSN 318A is responsible for authentication and mobility management for mobile devices as well as for tracking and paging procedures for mobiles in idle mode for 2G RAN or 3G RAN. Subscriber Profile Repository (SPR) 312A is a database that provides information such as subscriber allowed services, permitted QoS and charging related information. Policy and Charging Rules Function (PCRF) 314A interfaces with PGW 316A and takes charging enforcement decisions.

In a 5G system, 5GC 304A represents a 5G core network and New Radio (NR) 340A represents a RAN of a 5G system. User Data Repository (UDR) 326A is a database for the 5G specific information about the subscriptions. Session Management Function (SMF) 330A is a control plane network function and User Plane Function (UPF) 332A is a data plane network function of 5GC 304A. Policy Control Function (PCF) 328A supports the necessary policy data parameters across the N7 interface in order to support the PGW-C functionality of SMF 330A. To enable interworking between EPC 302A and 5GC 304A, SGW (e.g., SGW-C 320A and SGW-U 322A) in EPC 302A connects to SMF+PGW-C 330A via S5-C interface and to UPF+PGW-U 332A via S5-U interface. Further, MME 324A in EPC 302A and AMF 338A in 5GC 304A interact directly through the N26 interface in order to enable interworking between EPC 302A and 5GC 304A. A combined Home Subscriber Server/Unified Data Management function (HSS/UDM) 334A also supports the interworking between EPC 302A and 5GC 304A.

Figure 3B:
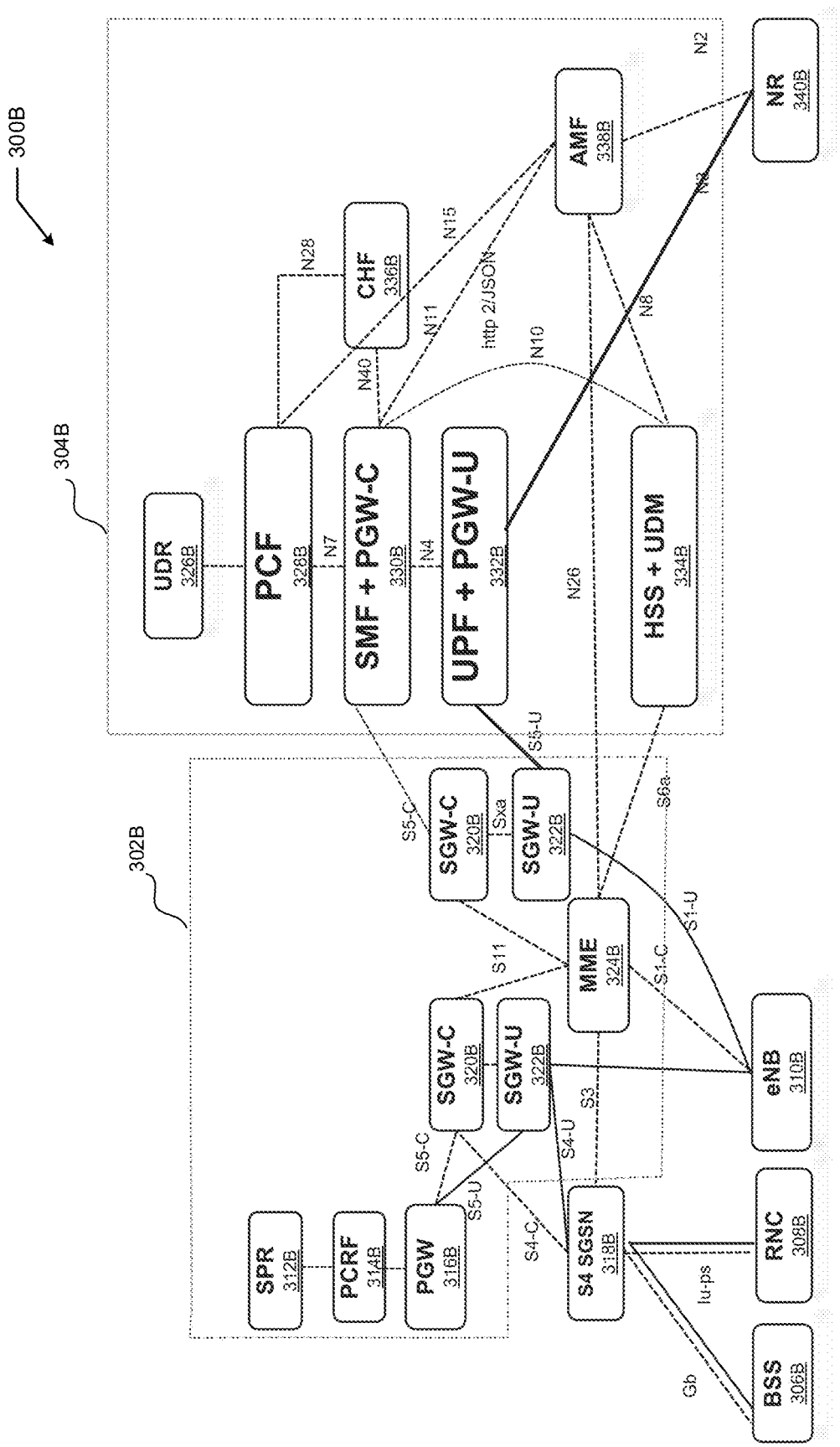

FIG. 3B illustrates another example of a conventional 5G network architecture 300B where 5G Core (5GC) 304B is designed to interoperate together with part of EPC 302B as specified in 3GPP specifications. Compared to the network architecture 300A illustrated in FIG. 3A, in the network architecture 300B, S4 SGSN 318B replaces Gn SGSN 318A and PGW 316B replaces PGW+GGSN 316A. S4-SGSN 318B is an evolution of Gn SGSN 318A, which supports 4G Core network behavior and protocol GTPC-v2 instead of 3G core network behavior and protocol GTPC-v1. S4-SGSN 318B interfaces with SGW-C 320B via S4-C interface (GTPC-v2 protocol) and SGW-U 322B via S4-U interface (GTPU-v1) protocol. PGW 316B does not include GGSN functionality in this network architecture 300B. PGW 316B anchors mobility between 2G, 3G and 4G without having to support legacy 2G/3G GGSN functionality. Network architecture 300B is not as widely deployed as network architecture 300A due to a high cost of updating from Gn SGSN 318A to S4 SGSN 318B. Therefore, a deployment of Gn SGSN 318A has been a more preferred option in the market for interworking 2G and/or 3G system and 4G and/or 5G packet core network.

The conventional 5G network architectures 300A and 300B do not support a 5G subscriber to interoperate with 2G or 3G access network and core network. There has been a proposal where N7 (interface to Policy Control Function (PCF) 328A and 328B) and N40 (interface to Charging Function (CHF) 336A and 336B) are added to PGW 316A and 316B. However, it is challenging to add the N7/N40 interfaces to the existing EPC 302A and 302B as it requires operators to re-implement PGW 316A and 316B in the core network to add the N7/N40 interfaces. Instead, a solution to support 2G or 3G functionality in 5GC that has a minimal impact on the functionality of 5GC is described in the following FIGS. 4A and 4B in accordance with aspects of the present disclosure.

Figure 4A:
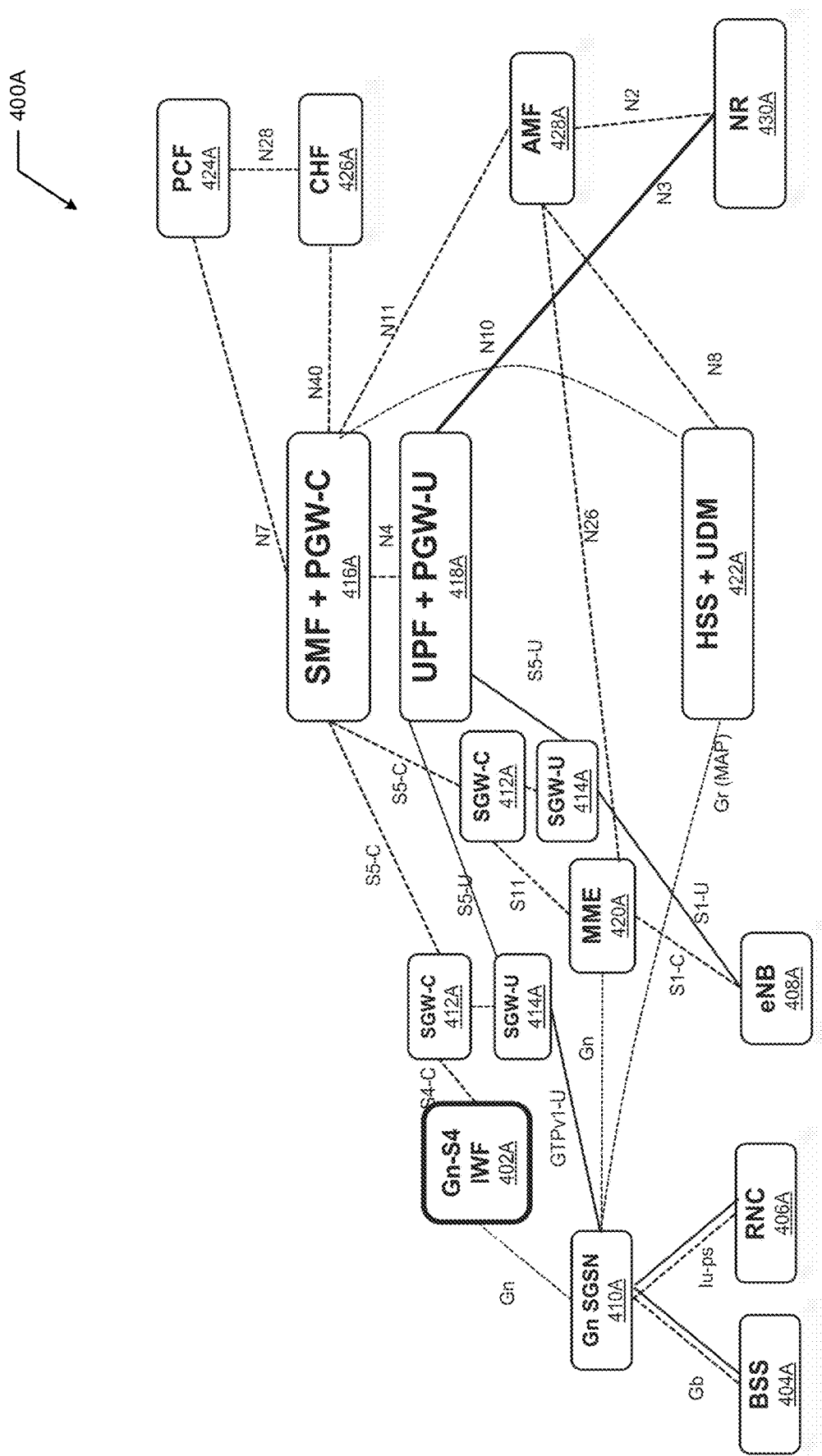
FIGS. 4A and 4B illustrate example diagrams of a 4G and 5G network architecture in which an interworking function is implemented according to one or more examples of the present disclosure.
Figure 4B:
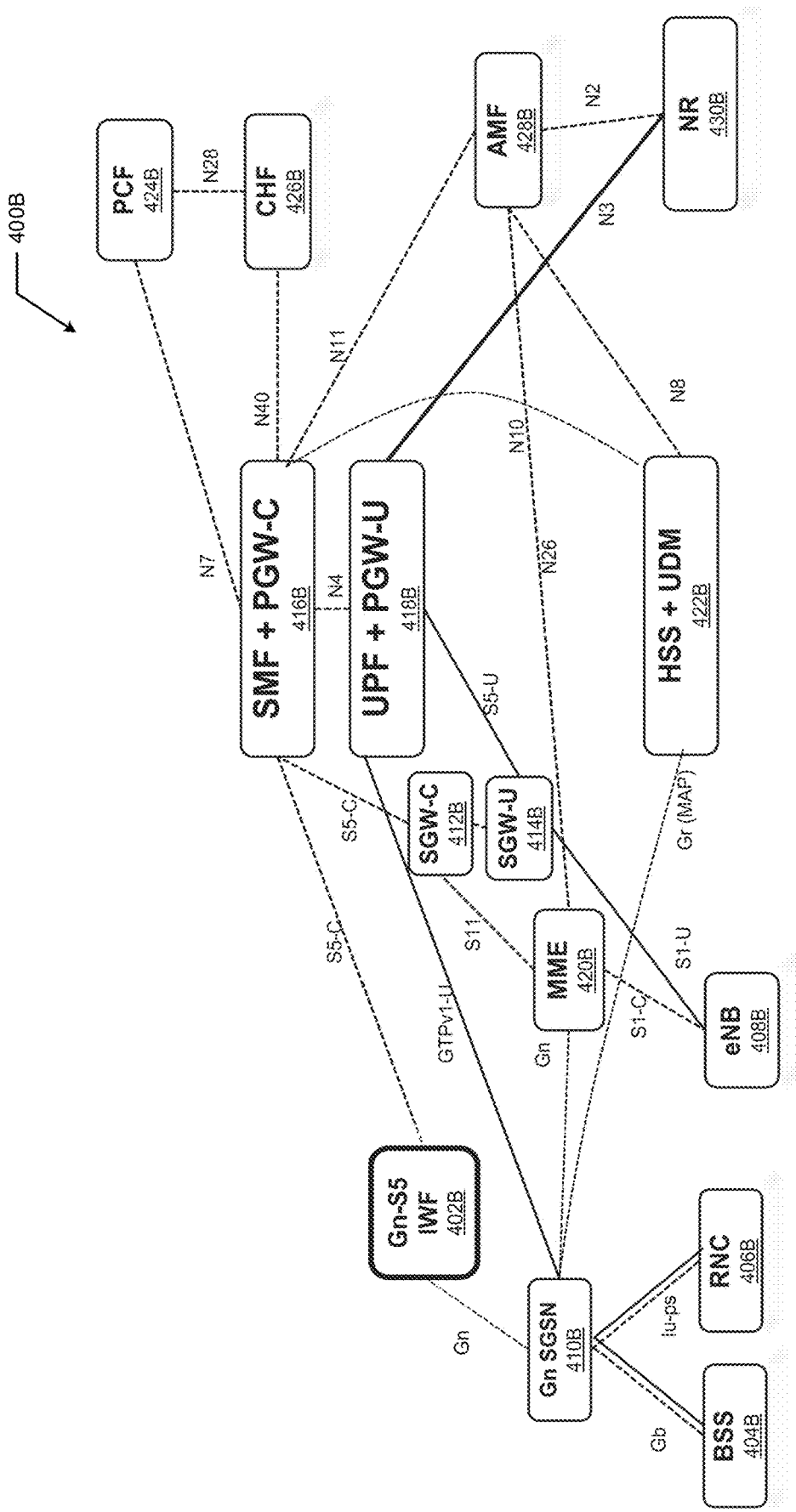

FIGS. 4A and 4B illustrate example diagrams of a 4G and 5G network architecture 400A and 400B in which an interworking function (IWF) is implemented, and in which one or more aspects of the present disclosure may operate. In a 2G network, BSS 404A and 404B and Gn SGSN 410A and 410B are connected by a Gb interface. In a 3G network, RNC 406A and 406B and Gn SGSN 410A and 410B are connected by an Iu interface. Gn SGSN) 410A and 410B is responsible for the delivery of data packets from and to the mobile stations and performs packet routing and transfer mobility management.

In some embodiments, a Gn-4G IWF (e.g., Gn-4G IWF 402A or Gn-S5 IWF 402B) can be established between a client access network and a packet anchor network. FIG. 4A shows an example network architecture 400A where a Gn-S4 IWF 402A is implemented. FIG. 4B shows an example network architecture 400B where a Gn-S5 IWF 402B is implemented. Gn interfaces can be used between Gn SGSN 410A and 410B and the interworking function (e.g., Gn-S4 IWF 402A or Gn-S5 IWF 402B) for signaling.

In some examples, Gn-S4 IWF 402A is connected to SGW-C 412A for signaling communication via S4-C. SGW-C 412A is then connected to SMF+PGW-C 416A using a S5-C interface as illustrated in FIG. 4A. A user traffic uses a S5-U interface between SMF+PGW-C 416A and SGW-U 414A and a S4-U interface between SGW-U 414A and Gn SGSN 410A. On the other hand, Gn-S5 IWF 402B does not require SGW-C as a logic of SGW-C 412B is incorporated with Gn-S5 IWF 402B. Instead, SMF+PGW-C 416B behaves like a PGW connected with SGW-C to an S4 SGSN. Further, when Gn-S5 IWF 402B is implemented, SGW-U 414B functionality can be removed as it is assumed to be incorporated into PGW-U functionality.

Gn-S4 IWF 402A can provide less signaling load on SMF 416A since signaling of most mobility and transition between idle and active states is terminated at the SGW-C 412A and SGW-U 414A. However, Gn-S5 IWF 402B can provide greater signaling load on SMF 416B, especially for a direct tunnel since all transitions between idle and active states will result in signaling to SMF 416B for a tunnel movement between RNC 408B and 3G SGSN 410B. More details of connecting user equipment with a packet data network gateway (PGW) through an interworking function (e.g., Gn-S4 IWF 402A and Gn-S5 IWF 402B) are described below with respect to FIGS. 6A and 6B.

Figures 5A, 5B:
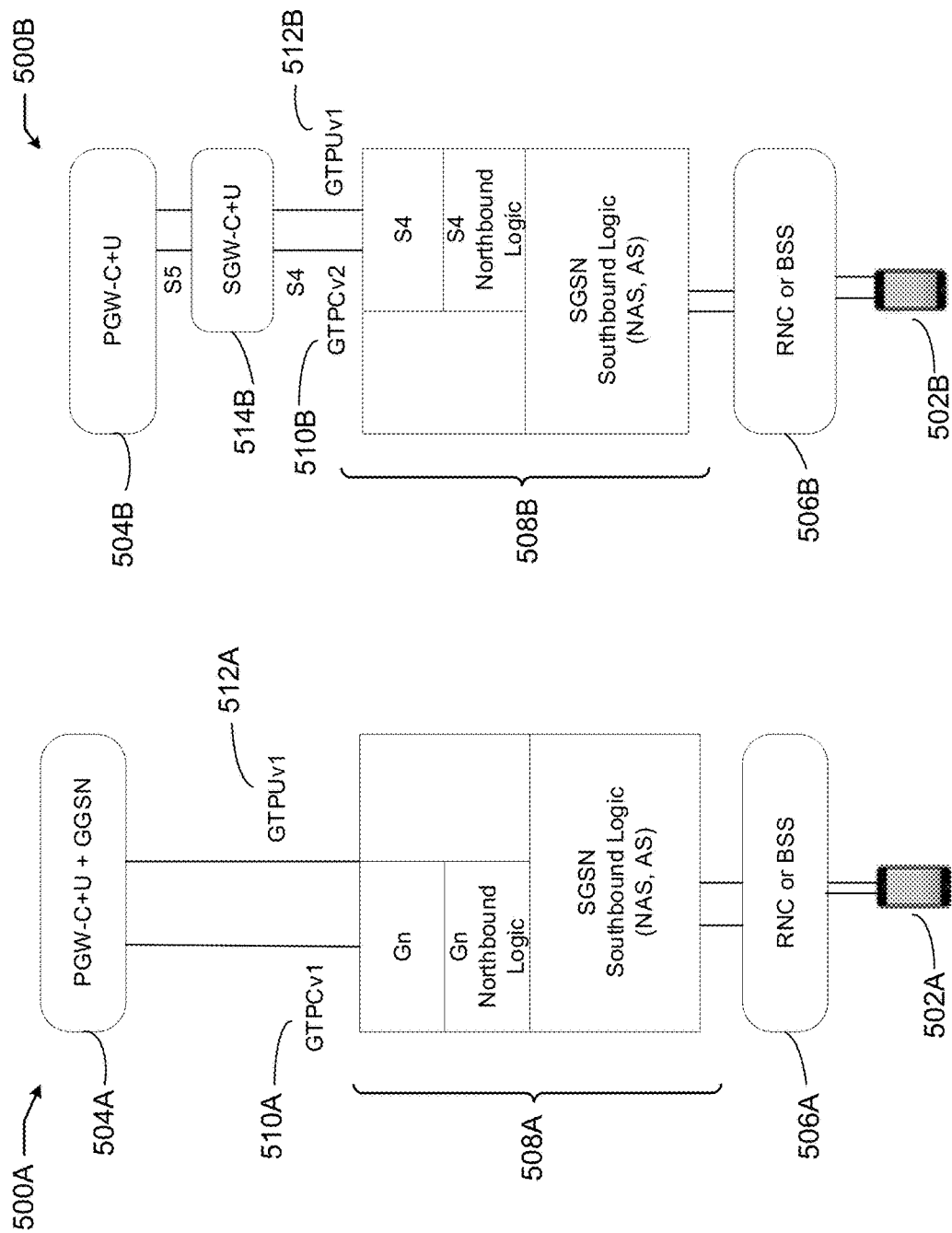
FIGS. 5A and 5B illustrate example diagrams of a conventional network architecture where a radio network controller (RNC) connects to a packet data network gateway (PGW).

FIGS. 5A and 5B illustrate example diagrams of a conventional network architecture 500A and 500B where RNC or BSS 506A and 506B connects to a packet data network gateway (PGW). 3GPP TS 23.060 describes techniques for connecting a user equipment (UE) to an EPC using a 3GPP access such as Evolved UMTS Terrestrial Radio Access Network (E-UTRAN), UTRAN (3G), and GSM EDGE Radio Access Network (GERAN) (2G). For example, as illustrated in FIGS. 5A and 5B, user equipment (UE) 502A and 502B are connected to PGW+GGSN 504A or PGW 504B, respectively, using a network controller RNC or BSS 506A and 506B. In a 3GPP access network, two types of Serving GPRS Support Nodes (SGSNs) can be deployed: Gn SGSN 500A, which is a legacy 2G/3G SGSN and S4 SGSN 500B, in which SGSN is upgraded to support a GTPC-v2 interface in EPC. Such SGSNs (e.g., SGSN 508A and 508B) allow UE 502A and 502B to access the EPC via the UTRAN (3G) and the GERAN (2G). Gn SGSN 500A uses a 2G/3G protocol (e.g., GTPC-v1 512A) and procedures (Packet Data Protocol (PDP) context related) to communicate with PGW+GGSN 504A, which connects EPC to external IP networks. S4 SGSN 500B uses a new 4G protocol (e.g., GTPC-v2 512B) and procedures (EPS bearer related) to communicate with PGW 504B and SGW 516B.

GTP is a group of IP-based communication protocols used to carry General Packet Radio Service (GPRS) within GSM (2G), UMTS (3G), and LTE (4G) networks and comprises of three different protocols: GTP Control (GTP-C), GTP User (GTP-U), and GTP Prime (GTP'). GTP-C (e.g., GTPv1-C 512A and GTPv2-C 512B) is used within the GPRS core network for signaling between gateway GPRS support nodes (GGSN) and serving GPRS support nodes (SGSN). Specifically, GTPv1-C 512A is used on a Gn interface and across a Gp interface. GTPv2-C 512B is used on various EPC signaling interfaces (e.g., S5, S8, and S11). GTP-U (e.g., GTPv1-U 514A and 514B) carries user data within the GPRS core network, and between the radio access network (RAN) and core network. For a 4G system, the key nodes have different but comparable names: MME in 4G compares to the SGSN in 3G and PGW in 4G compares to the GGSN in 3G.

Figure 6A:
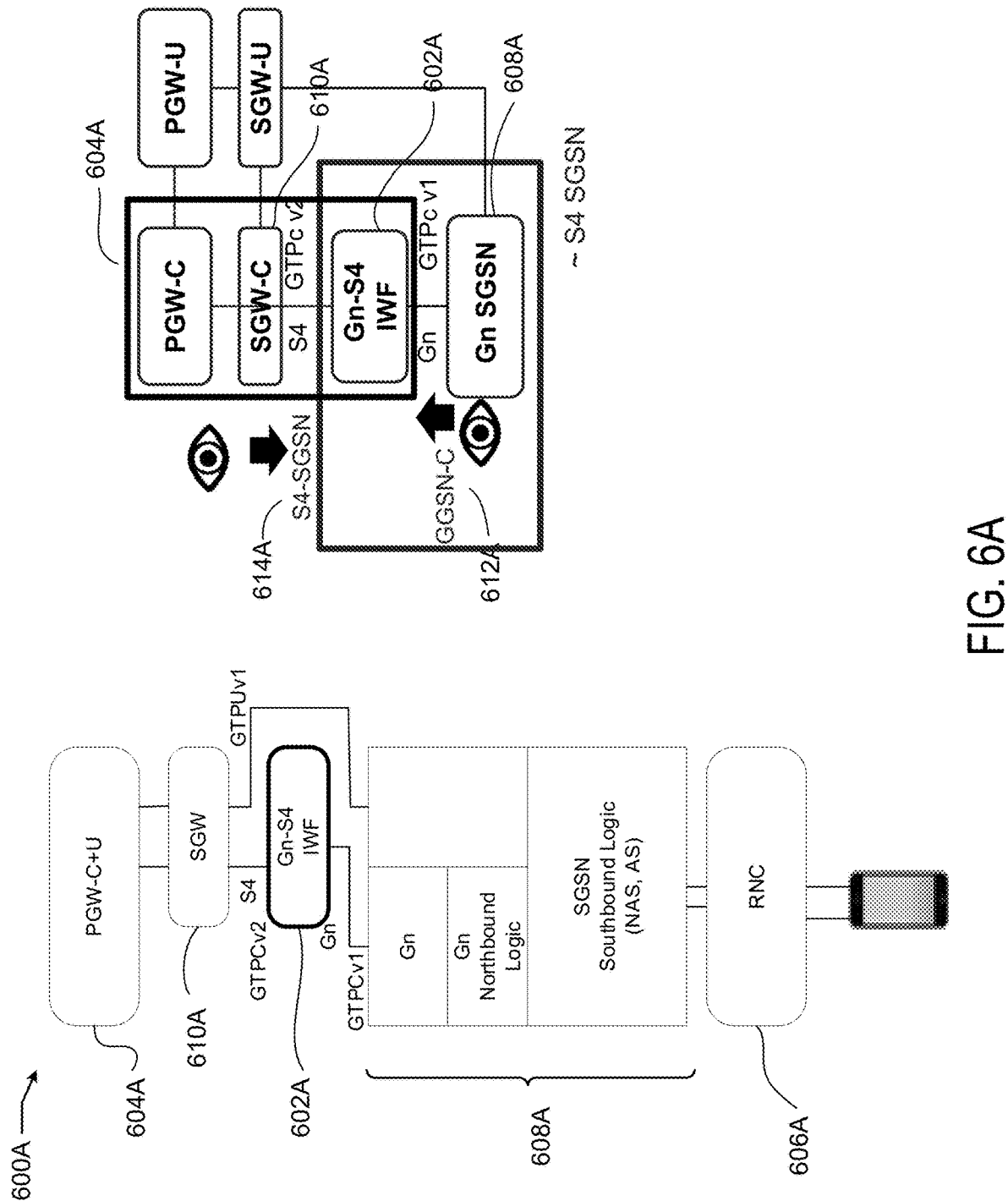
FIGS. 6A and 6B illustrate example diagrams of a network architecture where an interworking function is implemented to support a connection between a radio network controller (RNC) and a packet data network gateway (PGW) according to one or more examples of the present disclosure.
Figure 6B:
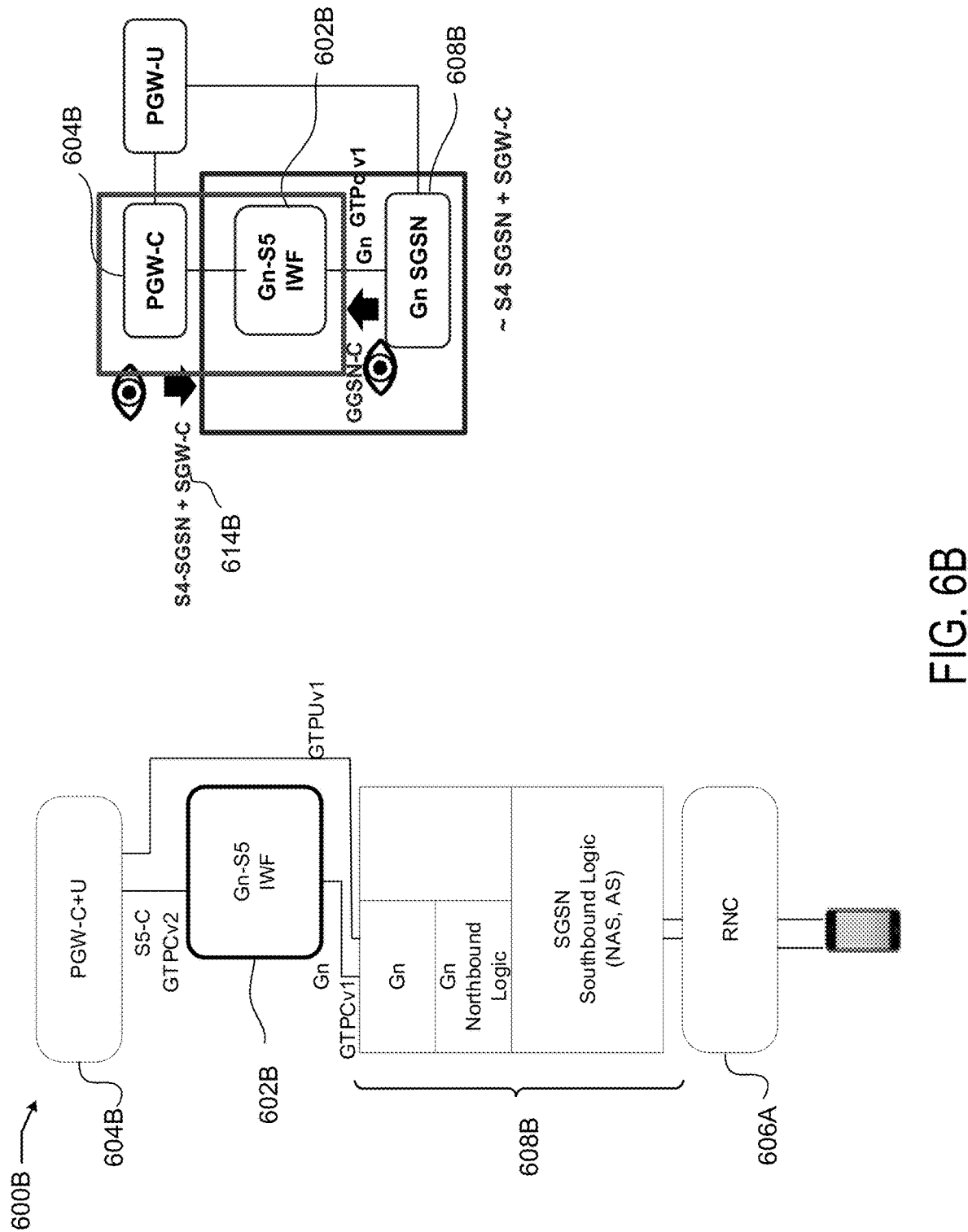

FIGS. 6A and 6B illustrate example diagrams of a network architecture 600A and 600B where an interworking function is implemented to support a connection between a radio network controller (RNC) and a packet data network gateway (PGW) according to one or more examples of the present disclosure. In some implementations, as shown in FIG. 6A, Gn-S4 IWF 602A can be implemented between a Gn interface from Gn/GP SGSN 608A and an S4 interface to SGW 610A and PGW 604A. In another implementation, as illustrated in FIG. 6B, Gn-S5 IWF 602B can be implemented between a Gn interface from Gn/Gp SGSN 608B an S5 interface to PGW 604B. Such implementation of Gn-S4 IWF 602A or Gn-S5 IWF 602B enables the PGW/SGW part of SMF to support S4/EPC related functionality with a minimal impact on existing 5GC functionality (e.g., SMF or UPF).

In some implementations, Gn-S4 IWF 602A can appear as GGSN 612A from a client access network. Concurrently, Gn-S4 IWF 602A can also appear as an S4 SGSN 614A from a packet anchor network. For example, one or more network functions of Gn-S4 IWF 602A can support GGSN functions 612A from a perspective of the client access network (e.g., GERAN or UTRAN). Concurrently, one or more network functions of Gn-S4 IWF 602A can support S4 SGSN functions 614A from a perspective of the packet anchor network (e.g., EPC or 5GC).

Similarly, in some examples, Gn-S5 IWF 602B can appear as GGSN 612B from a client access network. Concurrently, Gn-S5 IWF 602B can also appear as an S4 SGSN 614B from a packet anchor network. For example, one or more network functions of Gn-S5 IWF 602B can support GGSN functions 612B from a perspective of the client access network (e.g., GERAN or UTRAN). Concurrently, one or more network functions of Gn-S5 IWF 602B can support S4 SGSN functions 614B from a perspective of the packet anchor network (e.g., EPC or 5GC).

FIGS. 7A and 7B illustrate example diagrams of a network architecture 700A and 700B with an interworking function (e.g., Gn-S4 IWF 702A in FIG. 7A or Gn-S5 IWF 702B in FIG. 7B) where user equipment (UE) 704A and 704B is in transition between an idle state and an active state according to one or more examples of the present disclosure.

In a conventional 3GPP access network where S4 SGSN is deployed (as shown in FIG. 5B), downlink packets are buffered in SGW 514B. Downlink data notification on the S4-C interface is sent to SGSN 508B to trigger the transition from an idle state to an active state. However, when Gn-S4 IWF 702A is implemented as illustrated in FIG. 7A, SGW 712A does not perform downlink buffering of packets in an idle state. The packets can be buffered at Gn SGSN 710A. Similarly, when Gn-S5 IWF 702B is implemented as illustrated in FIG. 7B, the packets can be buffered at Gn SGSN 710B. Therefore, with respect to SGW 712A or PGW 708A and 708B, UE 704A and 704B is always in a connected state. For example, when an operation mode of a client (e.g., UE 704A and 704B) is changed from an idle mode to an active/connected state or vice versa, a tunnel establishment for downlink buffering of data can be determined based on the operation mode of the client (e.g., UE 704A and 704B).

In some embodiments, as illustrated in FIG. 7A, in a network where Gn-S4 IWF 702A is implemented, when the client (e.g., UE 704A) is in an idle state, a tunnel can be established between SGW 712A and Gn SGSN 710A for performing downlink buffering. Similarly, in a network where Gn-S5 IWF 702B is implemented as illustrated in FIG. 7B, a tunnel can be established between PGW 708B and Gn SGSN 710B when UE 704B is in an idle state.

A Tunnel Endpoint Identifier (TEID) for downlink is an IP address of RNC (e.g., RNC 706A and 706B) when UE (e.g., UE 704A and 704B) is in an active/connected state. When UE (e.g., UE 704A and 704B) is in an idle state, then the TEID is an IP address of SGSN (e.g., Gn/Gp SGSN 710A and 710B). However, the presence or absence of the tunnel does not affect the functionality of the interworking function (e.g., Gn-S4 IWF 702A or Gn-S5 IWF 702B).

Figures 8, 9:
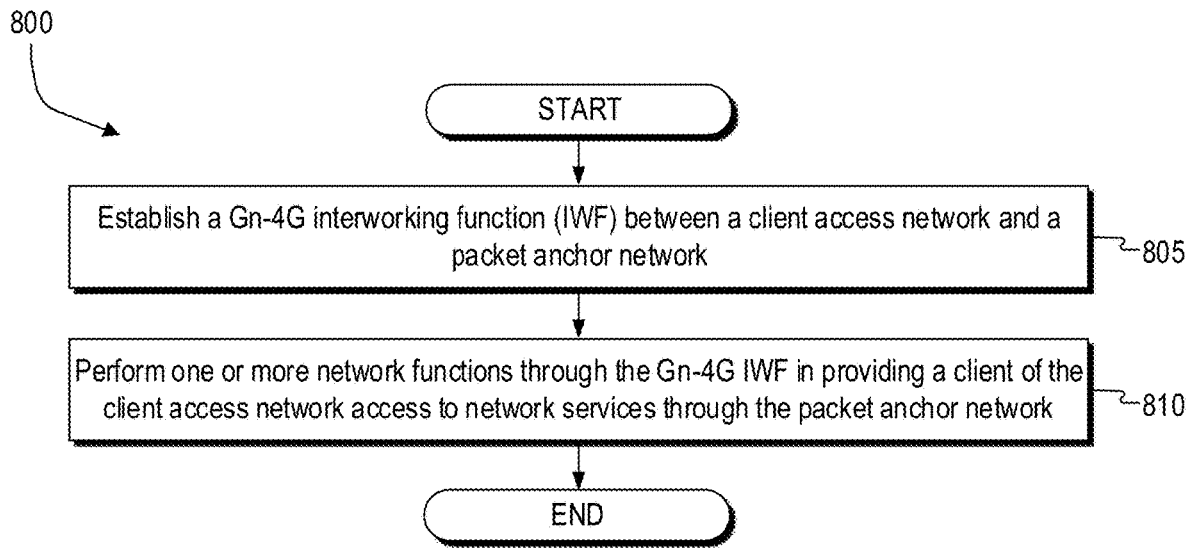
FIG. 8 illustrates a flowchart of a method for establishing a connection between a device within a 2G or 3G network and a 5G network via an interworking function according to one or more examples of the present disclosure.
FIG. 9 illustrates an example diagram of a network architecture where an interworking function is implemented according to one or more examples of the present disclosure.

FIG. 8 is a flowchart of a method 800 for establishing a connection between a device within a 2G or 3G network and a 5G network via an interworking function (IWF) according to an example of the present disclosure. At step 805, a Gn-4G IWF is established between a client access network and a packet anchor network. At step 810, one or more network functions through the Gn-4G IWF can be performed in providing a client of the client access network access to network services through the packet anchor network.

In some embodiments, the client access network can be a GSM Edge Radio Access Network (GERAN) for a 2G network system. In another embodiment, the client access network can be a UMTS Terrestrial Radio Access Network (UTRAN) for a 3G network system.

In some examples, the Gn-4G IWF can be a Gn-S4 IWF (e.g., Gn-S4 IWF 402A), which appears as a standalone S4 SGSN function as illustrated in FIG. 4A. In another example, the Gn-4G IWF can be a Gn-S5 IWF (e.g., Gn-S5 IWF 402B), which appears as an S4 SGSN function integrated into a SGW-C function as illustrated in FIG. 4B.

Furthermore, the Gn-4G interworking function can be implemented at one or more servers in the packet anchor network. In some examples, the packet anchor network can be part of a 5G Core network (5GC). In another example, the packet anchor network can be part of a 4G Core network, EPC.

Additionally, the one or more network functions can appear as one or more Gateway GPRS Support Node (GGSN) functions from the client access network. The one or more network functions can concurrently appear as one or more S4 Serving GPRS Support Node (SGSN) functions from the packet anchor network.

As described above with respect to FIGS. 6A and 6B, Gn-S4 IWF 602A can appear as a standalone S4 SGSN function or an S4 SGSN function integrated to a SGW-C function. In some examples, the network functions of the IWF (e.g., Gn-S4 IWF 602A or Gn-S5 IWF 602B) can appear as one or more Gateway GPRS Support Node (GGSN) functions from the client access network (e.g., GERAN or UTRAN). Concurrently, the network functions of the IWF (e.g., Gn-S4 IWF 602A or Gn-S5 IWF 602B) can appear as one or more S4 SGSN functions from the packet anchor network (e.g., EPC or 5GC).

In some implementations, the IWF (e.g., Gn-S4 IWF or Gn-S5 IWF) can perform one or a combination of mapping between QoS parameters of the client access network and QoS parameters of the packet anchor network, converting data passing through the Gn-4G IWF between differing protocols of the client access network and the packet anchor network. For example, the IWF can receive QoS parameters of 4G network from a SMF and map the QoS parameters of 4G network to 2G or 3G QoS parameters.

Furthermore, in some embodiments, the IWF can perform a conversion between GTPv1-C and GTPv2-C. For example, the interworking function can map from GTPv1-C to GTPv2-C, or vice versa. As described above with respect to FIGS. 5A and 5B, GTPv1-C is used on a Gn interface and across a Gp interface. GTPv2-C is used on various EPC signaling interfaces (e.g., S5, S8, and S11). GTPv1-C can be used for roaming and inter access mobility between Gn/Gp SGSNs and MMES. Both GTPv1-C and GTPv2-C can carry various types of control plane signaling messages. More details on the mapping procedures between GTPv1-C and GTPv2-C are described in FIGS. 11A and 12B.

In some embodiments, the IWF can perform SGW-C selection so that the SGW-C selection by another function (e.g., MME/SGSN) or Domain Name System (DNS) is unnecessary. The IWF can further control the transmission of data to and from a SGW of the packet anchor network.

FIG. 9 illustrates an example diagram of a network architecture 900 where an interworking function is implemented according to one or more examples of the present disclosure. In some embodiments, an IP address preservation can be carried out during a handover between a 2G or 3G network and a 4G or 5G network. For example, in a network architecture where an interworking function (e.g., Gn-S4 IWF or Gn-S5 IWF) is implemented, when a client (e.g., UE) roams between the client access network and the packet anchor network, for example, from a 3G network to a 4G network, or vice versa, an IP address of the client can be maintained while the interworking function performs one or more network functions.

To enable IP address continuity when the client (e.g., UE) moves between a 2G or 3G radio access network and a 4G radio access network, the following can be achieved. First, the IP address for Gn-S5 IWF 902 is the same as the address for SMF+PGW-C 904. Also, an uplink Tunnel Endpoint Identifier (TEID) used for a GTP-C connection between Gn-S5 IWF 902 and Gn SGSN 912 is the same as the uplink TEID used for a GTP-C connection between Gn-S5 IWF 902 and the SMF+PGW-C 906. Therefore, when mobility occurs between a 2G or 3G network and a 4G network and a context is transferred between Gn-SGSN 912 and MME 914, a signaling connection endpoint, IP address, and an uplink TEID remain unchanged.

When a GTPv1-C message 908 comes into the SMF+PGW-C 904 and Gn-S5 IWF 902 node, the message will get routed to the Gn-S5 IWF 902 based on the version of the GTP protocol. FIG. 9 describes a network where a Gn-S5 IWF 902 is implemented, but a Gn-S4 IWF can be alternatively implemented in a similar fashion. Furthermore, an uplink TEID allocation can be performed by SMF+PGW-C 904 and reused by Gn-S5 IWF 902 for the Gn interface to Gn-SGSN 912.

Figure 10A:
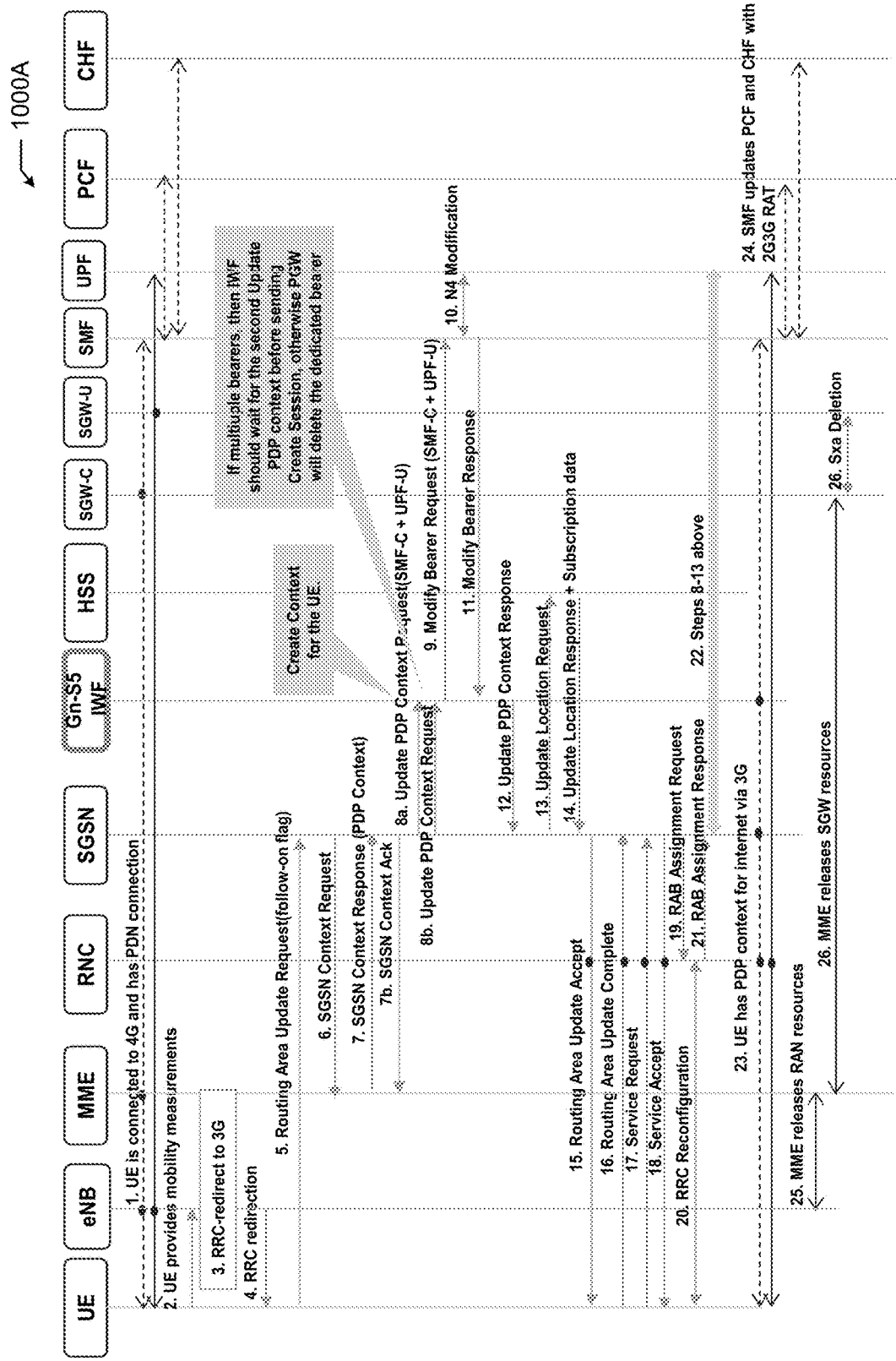
FIGS. 10A and 10B illustrate an example procedure of a handover between a 3G system and a 4G system for a 5G subscriber according to one or more examples of the present disclosure.
Figure 10B:
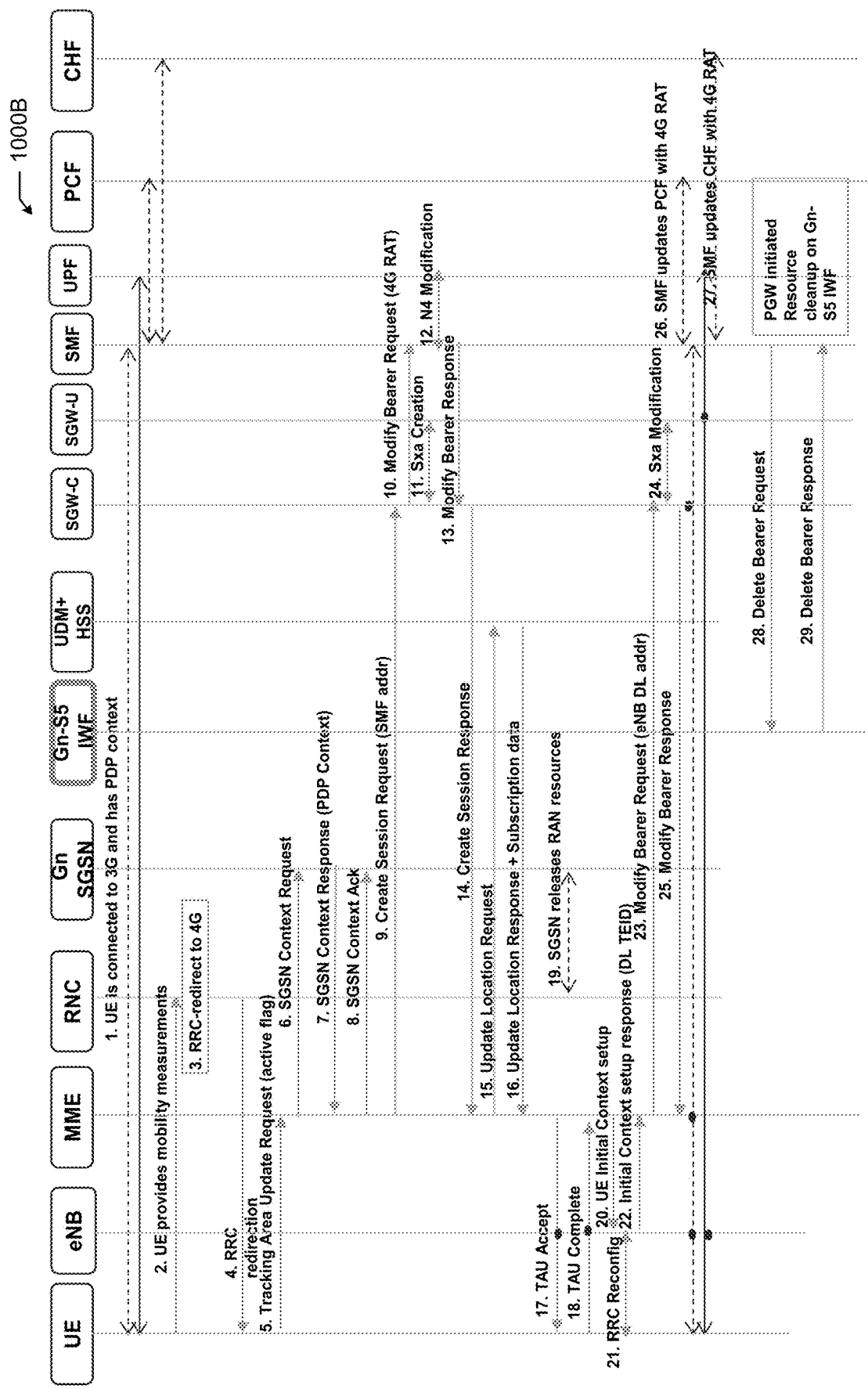

FIGS. 10A and 10B illustrate an example procedure 1000A and 1000B of a handover between a 3G system and a 4G system for a 5G subscriber according to one or more examples of the present disclosure. A Gn-4G IWF (e.g., Gn-S4 IWF or Gn-S5 IWF) can perform mapping of one or more Gn messages to one or more S4 massages to modify a bearer request, a bearer command, or a bearer resource command based on the mapping. FIG. 10A illustrates an example procedure 1000A of a handover from a 3G system to a 4G system for a 5G subscriber where Gn-S5 IWF is implemented. Gn-S4 IWF can also be alternatively implemented in a similar fashion. FIG. 10B illustrates an example procedure 1000B of a handover from a 4G system to a 3G system for a 5G subscriber where Gn-S5 IWF is implemented. Gn-S4 IWF can also be alternatively implemented in a similar fashion.

In a conventional network architecture, SGSN sends a message to SGW to release access to a bearer request. However, in some embodiments in accordance with aspects of the present disclosure, a bearer request can be simply modified without having to remove a tunnel established between SGW and Gn/Gp SGSN.

In FIG. 10A, at steps 8a, 8b, 9, 10, and 11, when a request to update Packet Data Protocol (PDP), the Gn-4G IWF (e.g., Gn-S4 IWF or Gn-S4 IWF) can modify a bearer request. Also, when there are multiple bearers, the Gn-4G IWF can wait for a second PDP context before sending a request to create a session. A similar procedure is performed for a handover from a 3G system to a 4G system as described in FIG. 10B.

FIGS. 11A and 11B illustrate examples procedures of mapping of GTPv1-C and GTPv2-C according to one or more examples of the present disclosure. In some embodiments, an interworking function (e.g., Gn-S4 IWF or Gn-S4 IWF) can perform a conversion between GTPv1-C and GTPv2-C. A detailed procedure of mapping from GTPv1-C to GTPv2-C is described in FIG. 11A. Furthermore, a detailed procedure of mapping from GTPv2-C to GTPv1-C is described in FIG. 11B.

Figure 12:
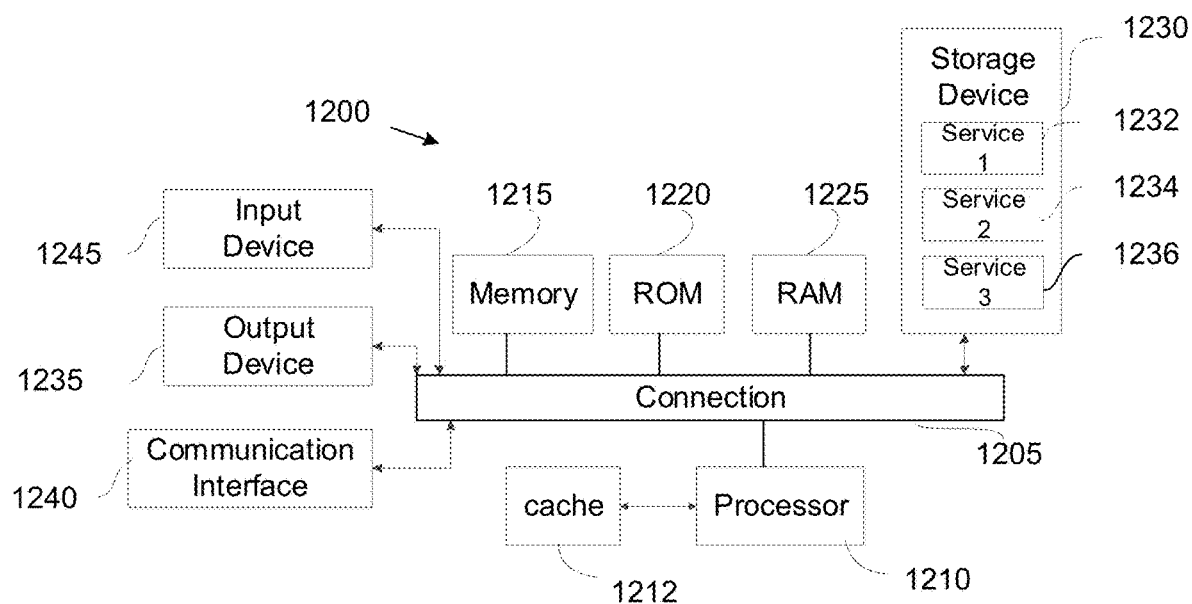
FIG. 12 shows an example computing system, which can be for example any computing device that can implement components of the system.

FIG. 12 illustrates an example computing system 1200 including components in electrical communication with each other using a connection 1205 upon which one or more aspects of the present disclosure can be implemented. Connection 1205 can be a physical connection via a bus, or a direct connection into processor 1210, such as in a chipset architecture. Connection 1205 can also be a virtual connection, networked connection, or logical connection.

In some embodiments computing system 1200 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read only memory (ROM) 1220 and random access memory (RAM) 1225 to processor 1210. Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

Figure 13:
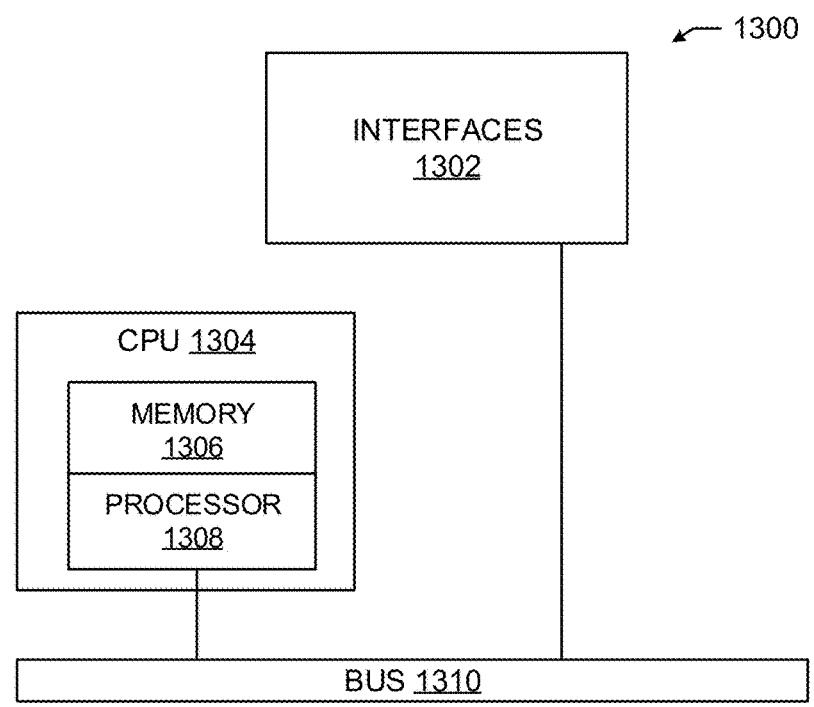
FIG. 13 illustrates an example network device.

FIG. 13 illustrates an example network device 1300 suitable for performing switching, routing, load balancing, and other networking operations. Network device 1300 includes a central processing unit (CPU) 1304, interfaces 1302, and a bus 1310 (e.g., a PCI bus). When acting under the control of appropriate software or firmware, the CPU 1304 is responsible for executing packet management, error detection, and/or routing functions. The CPU 1304 preferably accomplishes all these functions under the control of software including an operating system and any appropriate applications software. CPU 1304 may include one or more processors 1308, such as a processor from the INTEL X86 family of microprocessors. In some cases, processor 1308 can be specially designed hardware for controlling the operations of network device 1300. In some cases, a memory 1306 (e.g., non-volatile RAM, ROM, etc.) also forms part of CPU 1304. However, there are many different ways in which memory could be coupled to the system.

The interfaces 1302 are typically provided as modular interface cards (sometimes referred to as "line cards"). Generally, they control the sending and receiving of data packets over the network and sometimes support other peripherals used with the network device 1300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1304 to efficiently perform routing computations, network diagnostics, security functions, etc.

Although the system shown in FIG. 13 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1300.

Regardless of the network device's configuration, it may employ one or more memories or memory modules (including memory 1306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1306 could also hold various software containers and virtualized execution environments and data.

The network device 1300 can also include an application-specific integrated circuit (ASIC), which can be configured to perform routing and/or switching operations. The ASIC can communicate with other components in the network device 1300 via the bus 1310, to exchange data and signals and coordinate various types of operations by the network device 1300, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:
1. A method comprising:
   establishing a Gn-4G interworking function (IWF) between a client access network and a packet anchor network; and
   performing one or more network functions through the Gn-4G IWF in providing a client of the client access network access to network services through the packet anchor network; wherein:
      the one or more network functions appear as one or more Gateway GPRS Support Node (GGSN) functions from the client access network;

the one or more network functions concurrently appear as one or more S4 Serving GPRS Support Node (SGSN) functions from the packet anchor network; and the one or more network functions include one or a combination of mapping between QoS parameters of the client access network and QoS parameters of the packet anchor network, converting data passing through the Gn-4G IWF between differing protocols of the client access network and the packet anchor network, and controlling transmission of data to and from a serving gateway of the packet anchor network.

2. The method of claim 1, wherein the Gn-4G IWF is a Gn-S4 IWF, which appears as a standalone S4 SGSN function.

3. The method of claim 1, wherein the Gn-4G IWF is a Gn-S5 IWF, which appears as an S4 SGSN function integrated to a Serving Gateway Control (SGW-C) function.

4. The method of claim 1, wherein the client access network is one of GSM Edge Radio Access Network (GERAN) or UMTS Terrestrial Radio Access Network (UTRAN).

5. The method of claim 1, wherein the Gn-4G interworking function is implemented at one or more servers in the packet anchor network.

6. The method of claim 1, wherein the packet anchor network is part of a 5G Core network (5GC).

7. The method of claim 1, wherein the packet anchor network is part of a 4G Core network.

8. The method of claim 1, further comprising:
detecting a switch in operation mode of the client between an active mode and an idle mode; and
controlling tunnel establishment for downlink buffering of data based on the operation mode of the client.

9. The method of claim 8, further comprising:
establishing a tunnel between a serving gateway and a Gn-SGSN for performing downlink buffering when the client is operating in an idle mode and the Gn-4G IWF is a Gn-S4 IWF;
establishing a tunnel between a packet anchor gateway and the Gn-SGSN for performing downlink buffering when the client is operating in an idle mode and the Gn-4G IWF is a Gn-S5 IWF.

10. The method of claim 1, further comprising:
maintaining an IP address of the client as the client moves between the client access network and the packet anchor network in accessing network services while the one or more network functions are performed at the Gn-4G IWF.

11. The method of claim 1, further comprising:
mapping one or more Gn messages to one or more S4 messages, wherein the one or more network functions modify one or more of a bearer request, a bearer command, and a bearer resource command based on the mapping.

12. A system comprising:
one or more processors; and
at least one computer-readable storage medium having stored therein instructions which, when executed by the one or more processors, cause the one or more processors to perform operations comprising:
establishing a Gn-4G interworking function (IWF) between a client access network and a packet anchor network; and
performing one or more network functions through the Gn-4G IWF in providing a client of the client access network access to network services through the packet anchor network; wherein:

the one or more network functions appear as one or more Gateway GPRS Support Node (GGSN) functions from the client access network;

the one or more network functions concurrently appear as one or more S4 Serving GPRS Support Node (SGSN) functions from the packet anchor network; and the one or more network functions include one or a combination of mapping between QoS parameters of the client access network and QoS parameters of the packet anchor network, converting data passing through the Gn-4G IWF between differing protocols of the client access network and the packet anchor network, and controlling transmission of data to and from a serving gateway of the packet anchor network.

13. The system of claim 12, wherein the Gn-4G IWF is a Gn-S4 IWF, which appears as a standalone S4 SGSN.

14. The system of claim 12, wherein the Gn-4G IWF is a Gn-S5 IWF, which appears as an S4 SGSN integrated to a Serving Gateway Control (SGW-C) function.

15. The system of claim 12, wherein the client access network is one of GSM Edge Radio Access Network (GERAN) or UMTS Terrestrial Radio Access Network (UTRAN).

16. The system of claim 12, wherein the Gn-4G interworking function is implemented at one or more servers in the packet anchor network.

17. The system of claim 12, wherein the packet anchor network is part of a 5G Core network (5GC).

18. The system of claim 12, wherein the packet anchor network is part of a 4G Core network.

19. A non-transitory computer-readable storage medium having stored therein instructions which, when executed by a processor, cause the processor to perform operations comprising:
establishing a Gn-4G interworking function (IWF) between a client access network and a packet anchor network; and
performing one or more network functions through the Gn-4G IWF in providing a client of the client access network access to network services through the packet anchor network; wherein:

the one or more network functions appear as one or more Gateway GPRS Support Node (GGSN) functions from the client access network; and the one or more network functions concurrently appear as one or more S4 Serving GPRS Support Node (SGSN) functions from the packet anchor networks; and the one or more network functions include one or a combination of mapping between QoS parameters of the client access network and QoS parameters of the packet anchor network, converting data passing through the Gn-4G IWF between differing protocols of the client access network and the packet anchor network, and controlling transmission of data to and from a serving gateway of the packet anchor network.

* * * * *